3,104,196
INSULATING MATERIALS

Richard F. Shannon, Lancaster, Ohio, assignor to Owens-Corning Fiberglas Corporation, a corporation of Delaware
No Drawing. Filed Jan. 23, 1959, Ser. No. 788,492
1 Claim. (Cl. 161—271)

This invention relates to insulating materials resistant to high temperatures and, more particularly, to discrete insulating bodies composed of expanded hardened synthetic resins having high temperature resistance by virtue of a coating thereon of a cementitious material.

Expanded synthetic resins, such as polystyrene, are presently being used in various low temperature insulation applications. Although such expanded synthetic resins have extremely low vapor permeabilities, and excellent compressive and flexural strengths, their poor temperature resistance renders their use in applications involving high temperatures impossible. For example, expanded polystyrene is recommended for applications only where temperatures do not exceed 160° to 180° F.

It has now been discovered that the temperature resistance of discrete, expanded synthetic resinous bodies, such as foamed polystyrene beads, can be substantially upgraded by providing a hardened, continuous, inorganic, cementitious coating of generally uniform thickness thereon. Such coated, foamed beads can be poured through small openings to provide insulation where inaccessibility renders the use of sheet or slab insulation impossible, or such coated beads may be utilized to produce a board wherein the inorganic cementitious coating is also used as an adhesive to bond the beads together into an integral board. The resulting board can be used successfully in such applications as roof decking and perimeter insulation because of its ability to withstand high temperatures without melting and collapsing.

It is, therefore, an object of the invention to provide an expanded, synthetic resinous body capable of withstanding temperatures which would normally cause said resinous body to melt and collapse.

More particularly, it is a further object of the invention to provide a plurality of improved, discrete, expanded, hardened synthetic resinous bodies which are resistant, by virtue of a coating, adhered to and enclosing each resinous body, of a hardened cementitious material, to temperatures above the softening temperature of the synthetic resin.

Other objects and advantages will in part be obvious, and will in part appear hereinafter.

For a better understanding of the nature and objects of the invention, reference should be had to the following detailed description.

According to the invention, an improved article of manufacture is provided. Such article comprises, as a core, an expanded, hardened synthetic resinous body, and a hardened, continuous, inorganic, cementitious coating of generally uniform thickness adhered to and enclosing said core.

The particular identity of the inorganic, cementitious material is relatively unimportant so long as it has the temperature resistance desired or required, is capable of being coated in a thin and uniform thickness onto the synthetic resinous body, and will adhere and form a strong bond therewith. In this respect, excellent results have been obtained when employing an indurated hydrosilicate cement as the coating material in accordance with the invention. For example, a thin coating of silicic acid has been used successfully to provide discrete, expanded resinous bodies having substantially increased temperature resistance by comparison with similar uncoated bodies. Indurated hydrosilicate coatings can also be produced from Portland cement, sodium silicate and similar compositions.

In addition to indurated hydrosilicates, various other cementitious materials may be employed in coating the expanded synthetic resins in accordance with the invention, with approximately equivalent results. For example, calcium aluminates, such as Alumnite, and calcium sulfates, such as gypsum cement, and magnesium oxychloride- and magnesium oxysulfate-cements can be successfully employed as the coating material.

In addition to the specific materials mentioned above, cementitious, gelatinous metal hydroxide coatings can also be used in accordance with the invention. Such coatings are produced by treating the expanded, synthetic resinous bodies with a polyvalent metal salt and a water soluble oxide or hydroxide to form an insoluble reaction product either in situ or by application as a pre-gel, said reaction product probably being the corresponding polyvalent metal hydroxide. Salts of aluminum, tin, titanium, chromium, magnesium and zirconium, preferably the acetates, formates, propionates, lactates or oxalates of such metals, are examples of polyvalent metals which form gelatinous types of water insoluble hydroxides. Because of the simplicity in use and because excess material can be eliminated by vaporization, it is preferred to make use of ammonium hydroxide as the component for reaction with the polyvalent metal to form the desired reaction product for application on the expanded, synthetic resin bodies; however, other inorganic, basic ammonium salts capable of releasing hydroxyl groups in solution may be used.

In addition to expanded polystyrene, already mentioned as a suitable synthetic resin to be employed as the core material in accordance with the invention, various other synthetic resins may be utilized. For example, phenol-formaldehyde partial condensation products, polyvinylchloride, polyacrylonitrile, polyacrylic esters, polymethacrylic esters, interpolymers of butadiene or other dienes and styrene or acrylonitrile, and polyethylene can be mentioned as suitable resins to form the discrete expanded core particles or beads in accordance with the invention.

The particular method and means employed in coating the discrete expanded synthetic resinous particles are relatively unimportant so long as a thin, continuous cementitious coating, of generally uniform thickness is provided on the particles by the use thereof. For example, the coating can be applied by spraying or dipping or other well known means.

An integral board can be produced from the expanded synthetic resinous particles. In producing such a board, or another shape, a suitable mold having interior dimensions which correspond with those desired in the final board or the like is filled with the particles, and a quantity of an inorganic cementitious material, sufficient in amount to fill all the void areas between the particles themselves and between the particles and the sides of the mold, is then poured over the particles. A mold cover or top is then placed over the mold and the cementitious material therein is hardened. It has been found that the inorganic cementitious materials disclosed above are excellent adhesives for the synthetic resinous particles and are also capable of providing the increase in heat resistance previously described. The particular quantity of the expanded, synthetic resinous particles utilized in producing a given size board can vary to a substantial extent, depending chiefly on the desired final density and strength required of the board product. Because of their low strengths, boards in which the ratio of the volume of the expanded particles to the volume of the cementitious materials exceeds approximately 100:1 are of limited use, even though being extremely light weight products. Because of their high density, boards in which this volume ratio is less than about 15:1 are of little value in insulation applications. Boards containing about 97 volume percent of expanded particles uniformly dispersed in an indurated hydrosilicate binder such as silicic acid, have been produced. Silicic acid or another binder or cementitious material which is capable of being poured in liquid or solution form into a mold filled with the expanded particles is preferred in producing such boards or the like. Boards of the above proportions of cementitious material and expanded particles are strong, lightweight products, having densities in the range of about 2 pounds per cubic foot to about 10 pounds per cubic foot and compressive strengths of approximately 10 to 50 pounds per square inch.

In addition to the method disclosed above an integral board can be produced from the expanded synthetic resinous particles by first providing thereon a hardened inorganic coating of the type described and then randomly dispersing the coated particles, in the indicated manner, in a hardenable adhesive material capable of forming a strong bond therewith. Such adhesive can be the same inorganic cementitious material forming the coatings on the individual expanded particles or can be any other suitable binder material.

It has been found to be particularly advantageous, and the results obtained of particular significance, when the expanded synthetic resinous cores are relatively small in size, and, further, when the ratio of the volume of inorganic coating to the volume of the expanded cores is between certain defined limits. For example, excellent results have been obtained when the ratio of the volume of the cementitious coating to the volume of the expanded core has been in the range of about 1:100 to about 15:100, and optimum results when in the range of 2:100 to 3:100. Smaller ratios than those mentioned above are notably less desirable because the coated, expanded bodies do not then have significantly improved heat resistance. Similarly, larger ratios than those mentioned are also less desirable, but in this case because the expanded bodies are poor thermal insulators, and are high density bodies.

In addition to the criticality of the above ratio of the volume of coating material to the volume of the expanded core, it has been found that the size or average size of the expanded synthetic resinous core material itself must be within certain limits in order to obtain the particularly advantageous results previously described. For example, bodies composed of a coated core having a diameter greater than approximately ½ inch do not have the excellent heat resistance preferred in accordance with the invention, even if the ratio of the volume of coating material to the volume of the core is within the range previously specified. Excellent results have been obtained when employing a uniform inorganic coating of the type described of approximately 0.01 inch thickness on discrete expanded synthetic resinous bodies ranging from approximately ⅛ inch to about ¼ inch in diameter. Such bodies have been found to withstand satisfactory temperatures up to 400° F. without any indication of melting when the core material has been expanded polystyrene (softening range 160° F. to 180° F.).

It has been further found that the inorganic coating of the type described not only protects the expanded, synthetic resinous core from melting but seems also to seal in the gas filling the expanded core and prevents collapse thereof.

The porous, expanded synthetic resinous beads employed as the core material in accordance with the present invention may be obtained from various commercial sources. For example, beads produced by the method disclosed in U.S. Patents 2,442,940 and 2,681,321 can be mentioned as suitable discrete, expanded bodies for use in accordance with the invention.

The following examples, wherein the term "percent" refers to percent by weight, unless otherwise indicated, are presented solely for the purpose of further illustrating and disclosing the invention, and are in no way to be construed as limitations thereon.

*Example 1*

Foamed polystyrene beads ranging from approximately ⅛ inch to about ¼ inch in diameter were coated with a 10 percent aqueous solution of aluminum chloride by quickly immersing the beads into the aluminum chloride solution, and then withdrawing them. Soon thereafter, and preferably while the beads were still wet with the solution of the aluminum chloride, the beads were wet with a 10 percent solution of ammonium hydroxide. A reaction product immediately developed in the form of a water insoluble gelatinous coating of an aluminum hydroxide. The reaction product remained strongly bonded to the foamed polystyrene bead surfaces and was continuous and of generally uniform thickness throughout. While elevated temperatures, such as up to 125–150° F. have been used to accelerate drying, it is sufficient if the coating on the surfaces of the foamed polystyrene beads is allowed to dry slowly in air. The volume and weight of the coating is determined by the concentrations of the solutions. In the present example, when employing a 10 percent aqueous solution of aluminum chloride and a 10 percent solution of ammonium hydroxide, a continuous and generally uniform coating approximately 0.015 inch in thickness was obtained. The coated, expanded, polystyrene beads produced were placed in an oven and heated to 350° F. for 10 minutes. Examination showed the coated beads to be unaffected by such a treatment, whereas uncoated beads, subjected to the same treatment for purposes of comparison, melted and collapsed.

*Example 2*

Foamed polystyrene beads ranging from approximately ⅛ inch to about ¼ inch in diameter, were dipped in a dilute solution of colloidal silicic acid at room temperature, allowed to remain in the solution for 5 seconds, and then withdrawn. The coating was then permitted to dry. Examination of the beads revealed that they had been provided with a continuous, hardened coating, strongly adhered to and enclosing the polystyrene beads. The coating was approximately 0.02 inch thick and was substantially uniform over the entire surface. The coated beads were unaffected by being subjected, in an oven, to a temperature of 350° F. for 10 minutes.

*Example 3*

A right parallelepipedal metal mold 24 inches by 12 inches by 1 inch was filled with foamed polystyrene beads approximately 0.3 inch in diameter, and having an apparent density of 1½ pounds per cubic foot. A hydrated calcium sulfate slurry at room temperature was then poured over the beads until the entire volume of the mold was filled with the resulting dispersion of beads and slurry. A cover was then placed over and attached to the mold, and the mold allowed to remain intact at room temperature. At the expiration of 2 hours, the mold cover was removed and the hardened calcium sulfate-polystyrene bead board removed therefrom. The board was found to have an apparent density of 8 pounds per cubic foot and a compressive strength in excess of 50 pounds per square inch. The board was an excellent thermal insulating material. The board was subjected to a temperature of 350° F. for 2 hours, and in a natural gas flame (at about 2000° F.) for 10 minutes; examination disclosed that the board remained rigid, and that the interior beads dispersed therethrough were unaffected.

The procedures described above have also been repeated using different ratios of cement to expanded core material. Excellent results have been achieved with as little as 1 volume of cement to 100 volumes of the core material, and with as much as 1 volume of cement to 15 volumes of the core material.

The discrete, expanded, coated synthetic resinous bodies produced in accordance with the invention may also be employed in combination with other materials in applications where their high temperature resistance may be beneficially utilized. For example, since foamed polystyrene beads melt and collapse at temperatures within the range of approximately 160–180° F., they cannot be combined with materials or resins requiring temperatures above about 180° F. to cure. Coated beads produced in accordance with the invention, however, can be used in such a combination. For example, previous attempts to combine foamed polystyrene beads with glass wool have not been successful because the beads have melted and collapsed at temperatures required to cure binder resins employed with the glass wool. Glass wool packs themselves are produced by randomly projecting glass fibers and a binder such as a phenol-formaldehyde onto a foraminous conveyor where a mass of fibers and binder is collected, and then passing the resulting mass through an oven at a temperature of 400° F. or higher to cure and harden the binder resin and to form the glass mat or pack. When the expanded beads were projected with the binder and glass fibers onto the conveyor, the beads melted and collapsed when the collected mass was passed through the curing oven. Expanded beads produced in accordance with the invention, however, can be projected with glass fibers and a binder, as described, and are not affected by the curing conditions (e.g., 10 minutes at 425° F.) required to harden the binder.

While what has been described is considered to be the more advantageous embodiments of the invention, it is obvious that many modifications and variations can be made in the compositions and specific procedures discussed without departing from the spirit and scope of the present invention, as those skilled in the art will readily understand. Such modifications and variations are considered to be within the purview and scope of the invention as defined by the appended claim.

What I claim is:

An insulating article comprising a plurality of bodily separate, spaced cores, each of said cores being an expanded, hardened, synthetic resinous body, a hardened, continuous, inorganic cementitious coating of generally uniform thickness adhered to and totally enclosing each of said cores, and a hardened, inorganic, cementitious binder adhering together adjacent ones of said coated cores, the ratio of the total volume of cementitious coating and binder to the total volume of cores being in the range of about 1:100 to about 1:15.

References Cited in the file of this patent

UNITED STATES PATENTS

| | | |
|---|---|---|
| 1,682,675 | Horsfield | Aug. 28, 1928 |
| 2,085,129 | Stoewener | June 29, 1937 |
| 2,267,913 | Halstead | Dec. 30, 1941 |
| 2,323,387 | Edelstein | July 6, 1943 |
| 2,635,971 | Rogers, et al. | Apr. 21, 1953 |
| 2,664,405 | Andersen et al. | Dec. 29, 1953 |
| 2,699,409 | Hashimoto | Jan. 11, 1955 |
| 2,717,841 | Biefeld et al. | Sept. 13, 1955 |
| 2,861,898 | Platzer | Nov. 25, 1958 |
| 2,862,834 | Hiler | Dec. 2, 1958 |
| 2,885,366 | Iler | May 5, 1959 |
| 2,910,396 | Randall et al. | Oct. 27, 1959 |
| 2,993,022 | Coler | July 18, 1961 |

FOREIGN PATENTS

| | | |
|---|---|---|
| 1,157,392 | France | Dec. 20, 1957 |